Patented May 14, 1935

2,001,422

UNITED STATES PATENT OFFICE 2,001,422

LIQUID COATING COMPOSITION

Hermann Heckel, Cincinnati, Ohio, assignor, by mesne assignments, to Emery Industries, Inc., Cincinnati, Ohio, a corporation of Ohio No Drawing. Application March 1, 1930, Serial No. 432,565

10 Claims. (Cl. 134—23)

This invention relates to liquid coatings and to plastic compositions. The class of materials to which the invention is directed are the water soluble adhesives, glues, sizes and gelatinous products which may be applied as liquid coatings or which may be prepared in the form of sheets, rollers or definitely molded products. The general class of adhesives, binders or plastics to which the invention is applicable are starches, dextrines, caseins, animal glue, gelatins, silicates, and other water soluble colloids possessed normally of general adhesive properties.

The problem to which the invention is directed in connection with the use of these water soluble colloidal materials resides in the fact that when these materials harden or dry they become too hard or brittle to be useful for many purposes or to be most useful for purposes for which their use is now attempted.

It is the object of the invention to provide a liquid body which can be used to coat materials and upon drying leaves a hard but flexible residue, film or coating. These liquid compositions may also be used for the manufacture of many kinds of hard but flexible molded objects.

The invention comprises forming a colloidal admixture of the water soluble colloid, water, mineral oil sulphonates and oil, preferably stable mineral oil. These classes of bodies are admixed to form a homogeneous colloidal structure which permits a wide selection of specific ingredients over a wide range of percentages, thereby adapting these colloidal bodies to a multitude of uses as coatings, plastics, and the like.

The mineral oil sulphonates are derived from the process of producing medicinal white oils and the light colored technical oils by treating a mineral oil with strong and/or fuming sulphuric acid and/or sulphur trioxide. As a result of this treatment two layers are formed, the upper layer known as the A layer or oil layer, and the lower layer known as the B layer or sludge layer. The sulphonates of the A layer are highly oil soluble and the sulphonates of the B layer are highly water soluble. The oil soluble sulphonates are known as mahogany sulphonates and are usually recovered from the oil layer by treating it with an aqueous alcoholic solvent. The sulphonates so recovered contain as a rule considerable entrained oil and may be further purified by distillation or by further extractions with higher proof alcoholic solvents. The sulphonates so treated to eliminate substantially all of the entrained oil or mother oil are called true mahogany.

The oil soluble sulphonates or mahogany sulphonates are preferably used in these colloidal compositions, in fact, it is preferable to use the true mahogany sulphonates. The use of the mahogany sulphonates in combination with a certain percentage of oil, preferably stable mineral oil, provides a liquid coating or a plastic which has the normally desirable properties characteristic of the adhesive employed, but has the added advantage that it is relatively flexible or yieldable and is not inclined to crack, chip or break readily. The mahogany sulphonates may be used in the form of sodium salts, these being remarkably stable under varying conditions, or in special cases the sulphonic acids or other salts may be employed.

Furthermore, a mixture comprising substantially 70 to 40% white mineral oil and 30 to 60% true mahogany sulphonates produces a homogeneous solution when mixed with water and such admixtures are highly suitable for softening casein, animal and gelatin glues, and sizes. The transparent properties which may be possessed by the colloidal material are unimpaired by the use of the softener or flexibility imparter above described.

In conjunction with the composition comprising the water soluble colloid, mahogany sulphonates, oil and water, it is possible to incorporate any desired pigment, filler, fiber or aggregate. Where desirable hardening agents such as the chromates and those of the formaldehyde series may be used without disturbing the general homogeneity of the colloidal structure formed by the main ingredients.

The following examples provide disclosure of but a few of the contemplated uses and I therefore desire to be limited only by the appended claims:

EXAMPLES

1. ADHESIVES (a) Hide or gelatin glue

The glue or gelatin is dissolved in water to form a 25 to 40% solution. The desired quantity of softener is then added and the mixture is stirred until a complete solution results. Twenty to fifty percent of the dry weight of the glue is recommended, but in special cases it may be desirable to use more.

(b) Casein glues

A 15 to 30% solution of casein in water is prepared, using 0.6 to 2.5% sodium hydroxide, depending on the viscosity required. Softener is added in such amount to attain the desired flexibility. As with hide or gelatin glue, 20 to 50% of the dry weight of casein is recommended, although it may be desirable to use more in special cases.

2. PAINTS AND SIZES

A filler such as china clay or a pigment is ground in the above described casein or hide glue solutions to obtain flexible sizes and paints for use in the textile, paper and paint industries.

3. HECTOGRAPH PLATES

The oiled paper or cloth is dipped into a glue solution containing 10 to 25% hide glue or gelatin, and to which has been added 1 to 4 parts the softener described above, the proportions being based on the dry weight of the glue or gelatin.

4. PRINTING ROLLERS

One part of glue or gelatin is dissolved in an equal weight of water. While the solution is still warm, 1 to 2 parts of softener is added. After thorough incorporation, the composition may be cast into rollers.

5. COMPOSITION CORK

Glue is dissolved to an extent of 40 to 50% in a mixture of 1 part of softener and 1 to 2 parts water. About 0.5% paraformaldehyde is added to serve as a hardening agent. About 15 to 30% of this binder is incorporated into the ground cork.

In the above examples glucose and glycerine may be used in conjunction with the softener. With the casein glues, lime may be added to render them water insoluble without in any way affecting the efficiency of the softener.

6. PLASTIFIER FOR CASEIN PLASTICS

In the dry process for the manufacture of casein plastics, rennet casein is mixed with 20 to 50% water and the above recommended white oil and true mahogany mixture. This converts the powder into a homogeneous plastic mass when passed through the heated cylinder press.

It has been found that the incorporation of 5 to 20% of the above described material with the casein-water mix produces an excellent transparent plastic mass. In addition to acting as a plasticizer, the elasticity of the product is increased somewhat.

Having described my invention, I desire to be limited only by the ensuing claims:

1. An aqueous solution of a water soluble adhesive of the class described, white oil, and mahogany sulphonic bodies in proportions adapted to form a hard but flexible composition upon drying.

2. A liquid composition, comprising an aqueous solution of a water soluble adhesive colloid of the class described, stable mineral oil emulsified throughout said aqueous solution, said emulsion stabilized by mahogany sulphonic bodies as emulsifying agents, the proportion of adhesive to oil being adapted to provide a body which dries but remains flexible.

3. A softener for water soluble colloidal adhesives of the type of starches, dextrines, caseins, animal glues, gelatins and silicates, said softener comprising 70 to 40% stable mineral oil and 30 to 60% mahogany sulphonic bodies.

4. A new composition of matter, comprising, an aqueous solution of a watersoluble adhesive colloid of the class described, true mahogany sulphonic bodies, and white mineral oil emulsified throughout said aqueous solution, the white oil being present in proportions adapted to soften the adhesive, the mahogany sulphonic bodies being present in proportions adapted to emulsify the white oil in the aqueous solution, the adhesive being present in proportions adapted to provide a body which upon drying has the normal properties of the adhesive but is flexible and does not break or chip readily.

5. A new composition of matter, comprising, a water soluble adhesive colloid of the class described, and a percentage of softener adapted to impart flexibility to the adhesive colloid when dry, said softener comprising stable mineral oil and mahogany sulphonic bodies.

6. A new composition of matter, comprising, a water soluble adhesive colloid of the class described, and a percentage of softener adapted to impart flexibility to the adhesive colloid when dry, said softener comprising white oil and true mahogany sulphonic bodies.

7. A new composition of matter, comprising, a water soluble adhesive colloid of the class described, and a percentage of softener adapted to impart flexibility to the adhesive colloid when dry, said softener comprising 70 to 40% stable mineral oil and 30 to 60% mahogany sulphonic bodies.

8. The method of imparting flexibility to water soluble adhesive colloids of the class described which upon drying tend to become brittle, said method, comprising, emulsifying in an aqueous solution of the adhesive colloid a stable mineral oil by using mahogany sulphonic bodies as the emulsifying agent for said oil.

9. The method of imparting flexibility to water soluble adhesive colloids of the class described which upon drying tend to become brittle, said method, comprising, incorporating an admixture of stable mineral oil and mahogany sulphonic bodies in an aqueous solution of the adhesive colloid, the percentage of mahogany sulphonic bodies being sufficient to emulsify the mineral oil.

10. The method of imparting flexibility to water soluble adhesive colloids of the class described which upon drying tend to become brittle, said method, comprising, incorporating an admixture of white oil and true mahogany sulphonic bodies in an aqueous solution of the adhesive colloid, the percentage of true mahogany sulphonic bodies being sufficient to emulsify the white oil.

HERMANN HECKEL.